(12) United States Patent
Park

(10) Patent No.: US 11,003,680 B2
(45) Date of Patent: May 11, 2021

(54) METHOD FOR PROVIDING E-BOOK SERVICE AND COMPUTER PROGRAM THEREFOR

(71) Applicant: PUBPLE CO., LTD., Goyang-si (KR)

(72) Inventor: Jong Han Park, Goyang-si (KR)

(73) Assignee: PUBPLE CO., LTD

( * ) Notice: Subject to any disclaimer, the term of this patent is extended or adjusted under 35 U.S.C. 154(b) by 0 days.

(21) Appl. No.: 16/477,261

(22) PCT Filed: Dec. 28, 2017

(86) PCT No.: PCT/KR2017/015608
§ 371 (c)(1),
(2) Date: Jul. 11, 2019

(87) PCT Pub. No.: WO2018/131825
PCT Pub. Date: Jul. 19, 2018

(65) Prior Publication Data
US 2019/0361907 A1    Nov. 28, 2019

(30) Foreign Application Priority Data

Jan. 11, 2017  (KR) ........................ 10-2017-0004234

(51) Int. Cl.
| | | |
|---|---|---|
| *G06F 40/10* | (2020.01) | |
| *G06F 16/25* | (2019.01) | |
| *G06F 16/245* | (2019.01) | |
| *G06F 3/0484* | (2013.01) | |
| *G06T 11/60* | (2006.01) | |
| *G06F 40/106* | (2020.01) | |
| *G06F 40/166* | (2020.01) | |
| *G06F 40/205* | (2020.01) | |

(52) U.S. Cl.
CPC ........ *G06F 16/254* (2019.01); *G06F 3/04842* (2013.01); *G06F 16/245* (2019.01); *G06F 40/106* (2020.01); *G06F 40/166* (2020.01); *G06F 40/205* (2020.01); *G06T 11/60* (2013.01)

(58) Field of Classification Search
None
See application file for complete search history.

(56) References Cited

U.S. PATENT DOCUMENTS 8,261,186 B2    9/2012  Mansfield et al.
8,352,855 B2    1/2013  Levy et al.
(Continued)

FOREIGN PATENT DOCUMENTS

JP    2014081834 A    5/2014
KR   1020110026286 A   3/2011
(Continued)

OTHER PUBLICATIONS

International Search Report (in English and Korean) and Written Opinion (in Korean) issued in PCT/KR2017/015608, dated Apr. 6, 2018; ISA/KR.

*Primary Examiner* — Justin S Lee
(74) *Attorney, Agent, or Firm* — Harness, Dickey & Pierce, P.L.C.

(57) ABSTRACT

Provided are a method by which e-book related content with a high readability of a text is produced while minimizing a cost and time required in service of the e-book related content, thereby allowing a user to efficiently use the thus produced content, and a computer program for the method.

10 Claims, 9 Drawing Sheets

(a) OutLines  ORIGINAL FONT (AI/PDF/EPS, ETC.)

(b) OutLines  TEXT OUTLINED VECTOR GRAPHICS (NO DISTORTION)

(c) OutLines  WEB FONT (DISTORTION CCURRED)

(d) OutLines  BITMAP IMAGE FONT (DISTORTION OCCURRED)

(56) References Cited

U.S. PATENT DOCUMENTS

| | | | |
|---|---|---|---|
| 8,365,072 B2 | 1/2013 | Mansfield et al. | |
| 8,438,472 B2 | 5/2013 | Mansfield et al. | |
| 8,443,278 B2 | 5/2013 | Mansfield et al. | |
| 8,473,467 B2 | 6/2013 | Levy et al. | |
| 8,719,701 B2 | 5/2014 | Mansfield et al. | |
| 8,832,549 B2 | 9/2014 | Mansfield et al. | |
| 8,892,992 B2 | 11/2014 | Mansfield et al. | |
| 9,063,911 B2 | 6/2015 | Levy et al. | |
| 9,460,063 B2 | 10/2016 | Mansfield et al. | |
| 9,575,945 B2 | 2/2017 | Mansfield et al. | |
| 9,959,259 B2 | 5/2018 | Mansfield, III et al. | |
| 2004/0165782 A1* | 8/2004 | Misawa | G06T 9/00 382/239 |
| 2004/0201633 A1* | 10/2004 | Barsness | G06F 16/34 715/864 |
| 2004/0205655 A1* | 10/2004 | Wu | G06F 40/166 715/201 |
| 2007/0216690 A1* | 9/2007 | Terazono | G06T 9/005 345/469.1 |
| 2010/0174732 A1 | 7/2010 | Levy et al. | |
| 2010/0174975 A1* | 7/2010 | Mansfield | G06F 40/14 715/227 |
| 2010/0174976 A1 | 7/2010 | Mansfield et al. | |
| 2010/0174977 A1 | 7/2010 | Mansfield et al. | |
| 2010/0174978 A1 | 7/2010 | Mansfield et al. | |
| 2010/0174979 A1 | 7/2010 | Mansfield et al. | |
| 2010/0174980 A1 | 7/2010 | Mansfield et al. | |
| 2010/0174982 A1 | 7/2010 | Mansfield et al. | |
| 2010/0174983 A1 | 7/2010 | Levy et al. | |
| 2010/0174985 A1 | 7/2010 | Levy et al. | |
| 2011/0304860 A1* | 12/2011 | Kim | G06F 3/1206 358/1.6 |
| 2012/0229391 A1* | 9/2012 | Skinner | G06F 3/04883 345/173 |
| 2013/0042172 A1 | 2/2013 | Mansfield et al. | |
| 2013/0185631 A1 | 7/2013 | Mansfield, III et al. | |
| 2013/0191728 A1* | 7/2013 | McKinney | G06F 40/166 715/243 |
| 2013/0232407 A1* | 9/2013 | Onuma | G06F 40/114 715/251 |
| 2013/0311490 A1 | 11/2013 | Mansfield et al. | |
| 2014/0160049 A1* | 6/2014 | Shin | G06F 3/04883 345/173 |
| 2015/0033116 A1* | 1/2015 | McKinney | G06F 40/205 715/239 |
| 2015/0042662 A1* | 2/2015 | Latorre-Martinez | G06T 13/205 345/473 |
| 2015/0199314 A1* | 7/2015 | Ratnakar | G06F 40/14 715/255 |
| 2015/0302242 A1* | 10/2015 | Lee | G06K 9/00442 382/189 |
| 2015/0324338 A1 | 11/2015 | Levy et al. | |
| 2015/0324340 A1* | 11/2015 | Tsui | G06F 3/0483 715/255 |
| 2016/0292264 A1* | 10/2016 | Hoshino | G06F 3/0485 |

FOREIGN PATENT DOCUMENTS

| | | |
|---|---|---|
| KR | 1020110112397 A | 10/2011 |
| KR | 1020120025960 A | 3/2012 |
| KR | 101371406 B1 | 3/2014 |

* cited by examiner (a)

(b)

METHOD FOR PROVIDING E-BOOK SERVICE AND COMPUTER PROGRAM THEREFOR

CROSS-REFERENCE TO RELATED APPLICATIONS

This application is a U.S. National Phase Application under 35 U.S.C. 371 of International Application No. PCT/KR2017/015608, filed on Dec. 28, 2017, which claims priority to Korean Patent Application No. 10-2017-0004234, filed on Jan. 11, 2017. The entire disclosures of the above applications are incorporated herein by reference.

BACKGROUND OF THE INVENTION

Field of the Invention

The present invention relates to a method for providing an e-book service and a computer program therefor. More specifically, the present invention relates to a method for producing a vector graphic-based e-book by importing a PDF (EPS) document, then converting and editing the document through a source analysis to convert a file format of the document to comply with an e-book standard EPUB 3 protocol, and to a computer program including a text recognition and utilization function included in a vector graphic.

Related Art

The following description merely provides background information relating to an embodiment according to the present disclosure, and does not constitute prior art.

Recently, a paradigm of education is changing as an educational environment and an educational policy of the government are changed. Various attempts have been made to support this changed educational environment. Among these attempts, e-books collectively refer to digital books which may record information such as characters and images on electronic media and may be used as books. The e-book has attracted attention as a new educational service model as a development and dissemination of e-learning content are activated.

An ePUB (Electronic PUBlication) is an e-book format standard developed by IDPF (International Digital Publishing Forum), and is currently a de facto standard format in an e-book market. With this trend, most e-books are currently being produced in the EPUB format. Currently, a state of an ePUB e-book production technology is at a basic stage, and it is difficult for publishers or individuals having content to produce an ePUB e-book. Moreover, it is difficult for the general public to produce the ePUB e-books because it requires knowledge of a programming language. For this reason, the publishers and individuals produce the ePUB e-book using an e-book authoring tool which is distributed free from distributors. However, the conventional e-book authoring tool so far still has a problem that it is difficult for users to handle. Further, some distortion may occur because an ePUB e-book production process is not fully automated. As a result, there is a limitation that additional human and material resources are consumed due to inspection and the like.

SUMMARY OF THE INVENTION

The present invention provides a method by which e-book related content with a high readability of a text is produced while minimizing a cost and time required in service of the e-book related content, thereby allowing a user to efficiently use the thus produced content, and to provide a computer program for the method.

In an aspect, an e-book producing program stored in a recording medium is provided. The e-book producing program is configured to be in combination with hardware to perform an e-book producing method. The method includes receiving original content including text information and image information, extracting meta information about the text information and the image information from the original content to generate collected data, extracting the text information from the original content and converting the text information into vector image information, extracting the image information from the original content and storing the image information in a predetermined image format, and generating an e-book file in a predetermined format based on the collected data, the vector image information, and the image information.

In another aspect, an e-book viewer program stored in a recording medium is provided. The e-book viewer program is configured to be in combination with hardware to perform an e-book viewing method. The method includes extracting collected data, vector image information, and image information included in a received e-book file, extracting layout information included in the collected data and displaying the vector image information at a location corresponding to a location coordinate value of text information included in the layout information, and displaying the image information at a location corresponding to a location coordinate value of image information included in the layout information.

DESCRIPTION OF EXEMPLARY EMBODIMENTS

Hereinafter, the present embodiment will be described in detail with reference to the accompanying drawings.

Figure 1:
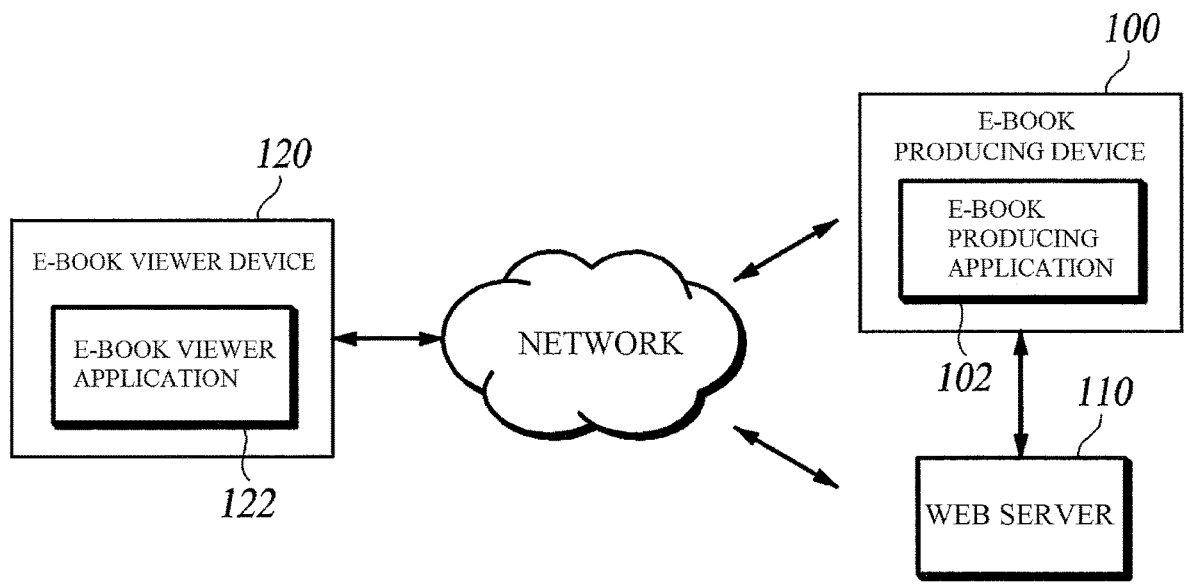
FIG. 1 is a schematic block diagram of an e-book service system according to the present embodiment.
Figure 1:
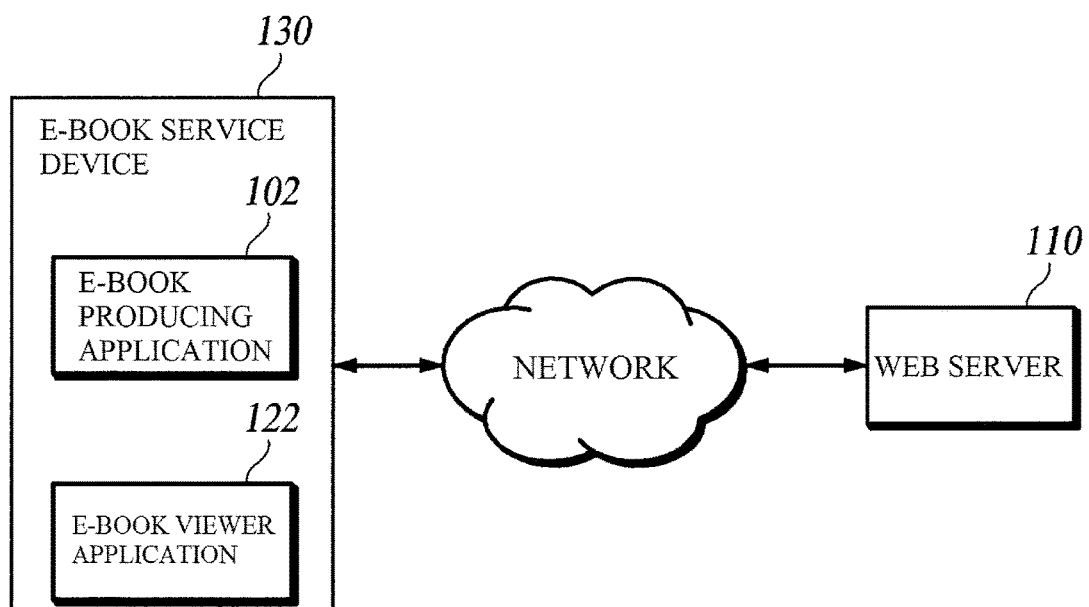

FIG. 1 is a schematic block diagram of an e-book service system according to the present embodiment. Further, FIG. 1a is a schematic block diagram illustrating an e-book service system according to a first embodiment of the present disclosure. In addition, FIG. 1b is a schematic block diagram illustrating an e-book service system according to a second embodiment of the present disclosure.

As shown in FIG. 1a, an e-book service system according to a first embodiment of the present disclosure includes an e-book producing device 100, a web server 110, and an e-book viewer device 120.

The e-book producing device 100 receives original content including text information and image information from the web server 110 or a user, and automatically generates and provides an e-book-related content file based on the received original content.

The e-book producing device 100 refers to a terminal capable of transmitting and receiving various data via a network based on a key operation of the user. The e-book producing device 100 may include a tablet PC, a laptop, a personal computer (PC), a smart phone, a personal digital assistant (PDA), a mobile communication terminal, and the like.

The e-book producing device 100 according to the present embodiment may be equipped with an e-book producing application 102 to provide an e-book-related content producing function. The e-book producing device 100 may drive the e-book producing application 102 by a user's operation or command, and provide an e-book-related content producing function via the e-book producing application 102. More specifically, regarding this e-book producing application 102, when the e-book producing device 100 is a smart phone, the e-book producing application 102 refers to an application downloaded through an application store and installed. In addition, when the e-book producing device 100 is a feature phone, the e-book producing application 102 refers to an application running on a virtual machine (VM) downloaded through a mobile-service company server.

Further, regarding a form in which the e-book producing application 102 is mounted in the e-book producing device 100 according to the present embodiment, the e-book producing device 100 may be implemented with the e-book producing application 102 mounted in an embedded manner. Alternatively, the e-book producing application 102 may be mounted in an operating system (OS) installed in the e-book producing device 100 in an embedded manner, or may be mounted in the OS in the e-book producing device 100 in an installation manner by user's operation or command. The e-book producing application 102 mounted in the e-book producing device 100 in the above-described manners may be implemented to operate association with another application (e.g., a data transmitting/receiving application, an authoring tool application, etc.) mounted in the e-book producing device 100, but is not limited thereto. Further, the e-book producing application 102 may be implemented to operate as an independent function without association with another application.

Hereinafter, an operation of the e-book producing device 100 for providing the production function for e-book-related content will be described. When the embedded e-book producing application 102 is executed, the e-book producing device 100 parses a received original content to extract meta information for text information and image information included in the original content, and generates collected data based on the extracted meta information. In this connection, layout information including a location coordinate value for each of the text information and the image information, and attribute information including a data value (text content) corresponding to the text information may be collected as the meta information. According to an embodiment, at least one of font information, size information, and color information for the text information may be additionally collected as the attribute information for the text information.

Further, in the case of the present embodiment, the e-book producing device 100 converts text information for which readability is important into vector-based graphics in the production of the e-book and provides the converted text information. In this connection, in a process of reconstructing a format of the text information into an image format, loss of data related to the original text information occurs. This means that there may be a problem that an error may occur as the e-book viewer device does not correctly recognize the text information when performing a function related to the text information. Therefore, prior to the imaging of the text information, the e-book producing device 100 according to the present embodiment extracts the meta information for the text information and the image information included in the original content, and generates and provides the collected data based on the extracted meta information. Such collected data functions as a substitute data for replacing the data related to the text information lost in the process of imaging of the text information.

The e-book producing device 100 extracts the text information from the original content and then converts the text information into vector image information. A vector image information is an image generated by applying a border and filling inside the border using dots and lines, which are vectors. The vector image information refers to an image format that may obtain the same appearance as the original even when zoomed in or out. This vector image information may always provide a clear image regardless of the zoom in/zoom out of the original because a boundary line is composed of lines.

The e-book producing device 100 according to the present embodiment converts the text information for which the readability is important into the vector-based graphics in the production of the e-book, thereby providing content having a high readability compared to the conventional one. Further, the e-book producing device 100 may reconstruct the format of the text information into the image format, and provide the reconstructed text information on a screen without a distortion. Thus, the occurrence of the error in the text information that may be caused by an attribute difference of fonts that may be supported by each e-book viewer device may be prevented in advance.

The e-book producing device 100 extracts the image information from the original content, and stores the extracted image information in a predetermined image format. In this connection, the image information extracted by the e-book producing device 100 is preferably image information corresponding to a background image in the content, but is not limited thereto.

The e-book producing device 100 according to the present embodiment stores the extracted image information in a bitmap image format. The bitmap image format is a method for storing and generating an image via an array of pixel data constituting the whole image. In addition, the bitmap image format has an advantage of not imposing a heavy load on a system no matter how complex and fine the image is. That is, the e-book producing device 100 according to the present embodiment stores the image information extracted from the original content in the bitmap image format, thereby minimizing a total capacity of an e-book file generated later.

Further, in another embodiment, the e-book producing device 100 may store the extracted image information in a vector image format, thereby providing a clearer image for the image information. In the present embodiment, the e-book producing device 100 does not limit the format in which the image information extracted from the original content is stored to a specific format.

The e-book producing device 100 generates an e-book file in a predetermined format based on the collected data, the vector image information, and the image information. In the present embodiment, the e-book producing device 100 preferably generates an e-book file in the ePUB (Electronic Publication) format based on the collected data, the vector image information, and the image information, but is not limited thereto.

Further, the e-book producing device 100 according to the present embodiment further utilizes an authoring tool program (e.g., illustration) stored in a hardware in the production of the e-book such that the above-mentioned processes related to the production of the e-book file may be performed automatically. That is, when the original content is input thereto, the e-book producing device 100 activates the authoring tool program in the hardware such that a predetermined script is executed and the above-mentioned processes are automatically performed by the executed script. A script file contains instructions written in a simple language other than a program language, and the like. In the present embodiment, the script file contains pre-written instructions for automatically performing the above-mentioned processes.

According to the present embodiment, the e-book-related content file is automatically generated utilizing the script function of the authoring tool program in the production of the e-book, thereby minimizing manufacturing cost and time required. Further, as the e-book production process is fully automated, the occurrence of the content distortion may be minimized, and inspection expenses, and the like incurred in connection with the content distortion may be reduced.

The e-book producing application 102 may be implemented to operate independently in a form having a separate software function or hardware function performed by the e-book producing device 100. Alternatively, the e-book producing application 102 may be implemented in a form of association with the separate software function or hardware function performed by the device 100.

The e-book producing application 102 is preferably mounted in the e-book producing device 100 and operated using various hardware provided in the e-book producing device 100, but is not limited thereto. The e-book producing application 102 may be implemented in a separate device and operated. Further, the e-book producing application 102 may operate association with pre-installed applications in the e-book producing device 100.

Further, regarding operations of the e-book producing application 102, the e-book producing application 102 is a kind of a program that is installed in the e-book producing device 100 and allows the e-book producing device 100 to provide the e-book producing function.

Further, such e-book producing application 102 may perform all the functions performed by the e-book producing device 100 described above, and a detailed description thereof will be omitted.

The web server 110 performs a function of providing the original content used for generating the e-book file to the e-book producing device 100.

The web server 110 may receive the e-book file generated by the e-book producing device 100 based on the original content from the e-book producing device 100, and provide the received e-book file to the e-book viewer device 120.

Further, in FIG. 1, it is illustrated that the e-book service system includes the web server 110, and provides the e-book-related file to the e-book producing device 100 and the e-book viewer device 120 through the corresponding web server 110. However, the e-book service system is not limited thereto. For example, the e-book producing device 100 and the e-book viewer device 120 may receive the e-book-related file via association with a portable storage device. In the present embodiment, a method by which the e-book producing device 100 and the e-book viewer device 120 receive the e-book-related file is not limited to a specific method.

The e-book viewer device 120 is a device that receives the e-book file from the web server 110 or the e-book producing device 100 and allows the user to view content of the received e-book file.

Likewise, the e-book viewer device 120 may include a tablet PC, a laptop, a personal computer (PC), a smart phone, a personal digital assistant (PDA), a mobile communication terminal, and the like.

The e-book viewer device 120 according to the present embodiment may mount an e-book viewer application 122 to provide a viewer function for the e-book-related content. The e-book viewer device 120 may drive the e-book viewer application 122 by a user's operation or command, and provides the viewer function for the e-book-related content via the e-book viewer application 122.

Hereinafter, an operation in which the e-book viewer device 120 provides the viewer function for the e-book-related content will be described. When the mounted e-book viewer application 122 is executed, the e-book viewer device 120 parses the received e-book file to extract the collected data, vector image information, and image information included in the e-book file.

The e-book viewer device 120 extracts the layout information included in the collected data and displays vector image information at a location corresponding to a location coordinate value of the text information included in the extracted layout information. In the present embodiment, the e-book producing device 100 converts the text information for which the readability is important into the vector-based graphics in the production of the e-book and provides the converted text information. That is, the e-book viewer device 120 displays and provides vector image information corresponding to the text information on a location where the original text information is displayed based on the layout information included in the collected data.

The e-book viewer device 120 displays the image information on a location corresponding to a location coordinate value of the image information included in the layout information.

The e-book viewer device 120 utilizes the collected data to provide various additional functions related to the text information displayed as the vector image information. Further, when the text information is imaged, the text information loses its function as text and becomes a figure itself. In this case, a conventional method for recognizing text information has a problem that the text information may not be recognized from the vector image information. Taking this into account, the e-book viewer device 120 according to the present embodiment utilizes the layout information and the attribute information of the text information included in the collected data to recognize the text information corresponding to the vector image information. Therefore, the additional functions such as selecting, copying, searching, highlighting, and the like related to the text information may be performed therethrough.

Further, a method for utilizing the collected data to provide the various additional functions related to the text information displayed as the vector image information will be described in more detail in FIG. 3.

This e-book viewer device 120 according to the present embodiment allows the various additional functions related to the text information to be performed while ensuring the readability of the text information.

The e-book viewer application 122 may be implemented to operate independently in a form having a separate software function or hardware function performed by the e-book viewer device 120. Alternatively, the e-book viewer application 122 may be implemented in a form of association with the separate software function or hardware function performed by the device 120.

The e-book viewer application 122 is preferably mounted in the e-book viewer device 120 and operated using various hardware provided in the e-book viewer device 120, but is not limited thereto. The e-book viewer application 122 may be implemented as a separate device and operated. Further, the e-book viewer application 122 may operate association with pre-installed applications in the e-book viewer device 120.

Further, regarding operations of the e-book viewer application 122, the e-book viewer application 122 is a kind of a program that is installed in the e-book viewer device 120 and allows the e-book viewer device 120 to provide the e-book viewer function.

Further, such e-book viewer application 122 may perform all the functions performed by the e-book viewer device 120 described above, and a detailed description thereof will be omitted.

FIG. 1b is the schematic block diagram illustrating the e-book service system according to the second embodiment of the present disclosure.

As shown in FIG. 1b, in the e-book service system according to the second embodiment of the present disclosure, the e-book producing device 100 and the e-book viewer device 120 may be implemented as a single device, for example, an e-book service device 130. In this case, the functions respectively performed via the e-book producing device 100 and the e-book viewer device 120 may be performed by the e-book service device 130 at once. Therefore, it may be more efficient than the e-book service system according to the first embodiment. To this end, an e-book producing application 102 and an e-book viewer application 122 may be mounted in the e-book service apparatus 130.

Figure 2:
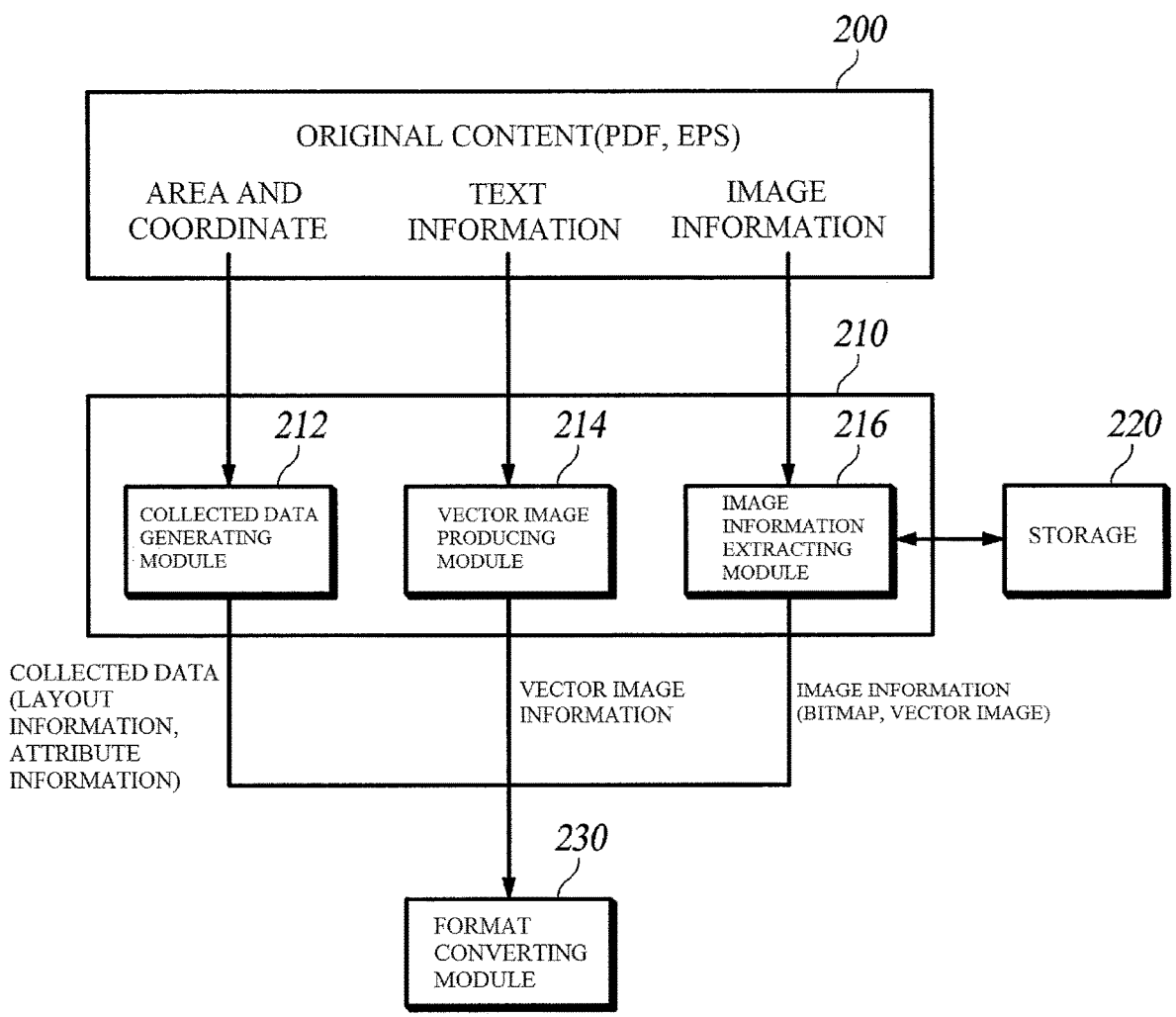
FIG. 2 is a schematic block diagram of an e-book producing device according to the present embodiment.

FIG. 2 is a schematic block diagram of an e-book producing device according to the present embodiment.

FIG. 2 is a schematic block diagram of the e-book producing device 100 according to the present embodiment. Such e-book producing device 100 may be implemented as a separate stand-alone device in which hardware of the terminal and the software of the e-book producing application 102 are combined. For example, functional modules of the e-book producing device 100 shown in FIG. 2 may be realized when the e-book producing application 102 installed in the e-book producing device 100 is driven.

The e-book producing device 100 according to the present embodiment includes an input module 200, a controller 210, storage 220 and a format converting module 230.

The input module 200 receives the original content for producing the e-book.

In the present embodiment, the input module 200 may receive the original content from the web server 110 or the user. To this end, the input module 200 may include communication means for communicating with an external device and a user interface for receiving a selection command from the user.

Further, the original content input via the input module 200 may contain the text information and the image information, and is preferably a content file produced in the EPS or PDF format, but is not limited thereto.

The controller 210 performs overall procedures necessary to produce the e-book.

The controller 210 may utilize the authoring tool program stored in the hardware or on the storage 220 of the e-book producing device 100 to produce the e-book. For example, in the present embodiment, when the original content is input, the controller 210 activates the authoring tool program such that the predetermined script is executed, and the procedures related to the e-book production are automatically performed by the executed script.

In the present embodiment, the controller 210 may be implemented in a form including a collected data generating module 212, a vector image producing module 214, and an image information extracting module 216.

The collected data generating module 212 parses the original content, extracts the meta information for the text information and the image information included in the original content, and generates the collected data based on the extracted meta information.

In this connection, the layout information including the location coordinate value for each of the text information and the image information, and the attribute information including the data value (text content) corresponding to the text information may be collected as the meta information. According to an embodiment, at least one of the font information, the size information, and the color information for the text information may be additionally collected as the attribute information for the text information.

Such collected data functions as the substitute data for replacing the data related to the text information lost in the process of imaging of the text information. At the same time, the collected data is used as reference data in the process of recognizing the text information by the e-book viewer device 120.

Further, the collected data generating module 212 preferably generates the collected data in a SCV (scalable vector graphics) format, but is not limited thereto.

The vector image producing module 214 extracts the text information from the original content and then converts the text information into the vector image information.

The vector image producing module 214 outlines a contour line of a character in the text information to calculate coordinates and numerical information about a plurality of lines constituting a text of the text information, then generates the text information as the vector image in the SCV (scalable vector graphics) format based on the calculated coordinate and numeral information, but is not limited thereto.

The image information extracting module 216 extracts the image information from the original content and stores the extracted image information in a predetermined image format. In this connection, the image information extracted by the image information extracting module 216 is preferably the image information corresponding to the background image in the content, but is not limited thereto.

The image information extracting module 216 according to the present embodiment stores the extracted image information in the bitmap image format or the vector image format.

The storage 220 stores files, programs, and the like necessary for producing the e-book. The storage 220 according to the present embodiment may store the original content for the e-book production and a final e-book file. Further, the storage 220 may store the authoring tool program used in the process of producing the e-book.

The format converting module 230 generates an e-book file of a predetermined format based on the collected data, the vector image information, and the image information. In the present embodiment, the format converting module 230 preferably generates the e-book file in a form of the ePUB (electronic publication) format based on the collected data, the vector image information, and the image information, but is not limited thereto.

When compressing the collected data, the vector image information, and the image information into a single file using a compression program, the format converting module 230 converts an extension of a single file into the ePUB format and stores the converted file, thereby generating the ePUB file.

Figure 3:
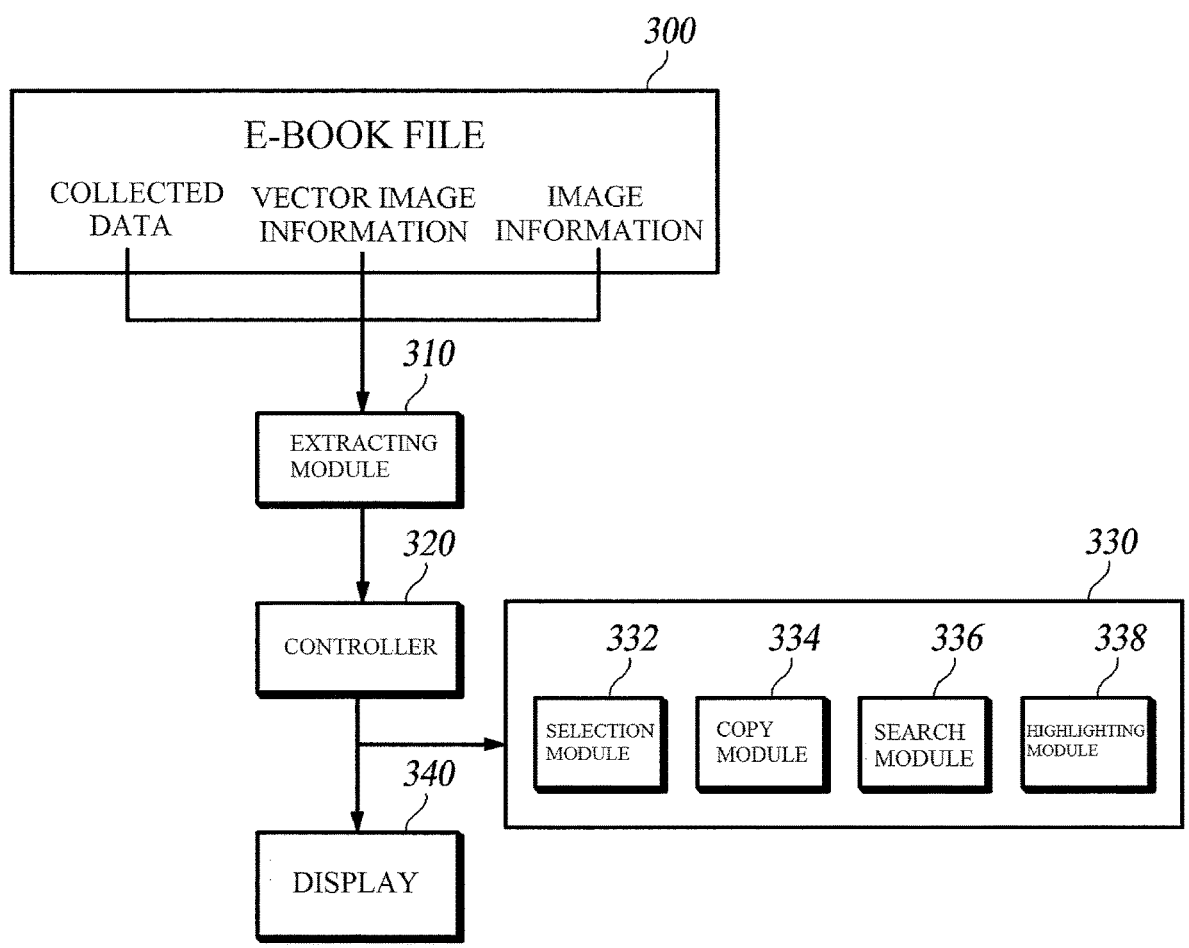
FIG. 3 is a schematic block diagram of an e-book viewer device according to the present embodiment.

FIG. 3 is a schematic block diagram of an e-book viewer device according to the present embodiment.

FIG. 3 is a schematic block diagram of the e-book viewer device 120 according to the present embodiment. Such e-book viewer device 120 may be implemented as a separate stand-alone device in which hardware of the terminal and the software of the e-book viewer application 122 are combined.

The e-book viewer device 120 according to the present embodiment includes a receiving module 300, an extracting module 310, a controller 320, a function providing module 330, and a display 330.

The receiving module 300 means a device for receiving the e-book file produced by the e-book producing device 110.

The extracting module 310 parses the e-book file received from the receiving module 300 and extracts the collected data, the vector image information, and the image information included in the e-book file.

The controller 320 controls an output of the e-book-related content based on the data extracted from the extracting module 310.

The controller 320 extracts the layout information included in the collected data and displays the vector image information at a location corresponding to the location coordinate value of the text information included in the extracted layout information. That is, the controller 320 displays and provides the vector image information corresponding to the text information on the location where the original text information is displayed based on the layout information included in the collected data.

The controller 320 displays the image information at the location corresponding to the location coordinate value of the image information included in the layout information.

The function providing module 330 provides various additional functions for the text information displayed as the vector image information using the collected data. Further, although not shown in FIG. 3, the e-book viewer device 120 may further include a user interface for receiving a user command from the user in connection with the additional functions performed by the function providing module 330.

In the present embodiment, the function providing module 330 may utilize the layout information and the attribute information of the text information included in the collected data to recognize corresponding text information in the vector image information, thereby providing the additional functions such as selection, copy, search, highlight, and the like related to the text information.

To this end, the function providing module 330 according to the present embodiment may be implemented in a form including a selection module 332, a copy module 334, a search module 336, and a highlighting module 338.

The selection module 332 performs a function of selecting text information corresponding to a specific area in the e-book. Hereinafter, a method for the selection module 332 to select the text information corresponding to the specific area in the e-book.

When recognizing a user selection of the specific area, the selection module 332 determines a location coordinate value of the text information corresponding to the specific area based on the layout information in the collected data. That is, when a selection of the vector image information disposed in a specific area is recognized, the selection module 332 calculates a location coordinate value of the specific area, then calculates a location coordinate value of the text information corresponding to the vector image information using the location coordinate value of the specific area and the layout information in the collected data. In this connection, the location coordinate value of the specific area may be x and y coordinates for a starting point A of the specific area and x and y coordinates for an end point B of the specific area. In this case, the location coordinate value of the calculated text information may be location coordinate values for all text information existing between the A coordinate and the B coordinate.

The selection module 332 extracts the data value of the text information corresponding to the location coordinate value of the text information based on the attribute information of the text information in the collected data.

The selection module 332 provides data value of the extracted text information as a response to the user selection. Further, in the present embodiment, a method for providing the data value of the text information extracted by the selection module 332 to the user is not limited to a specific method.

The copy module 334 provides a copy function of the text information previously selected by the selection module 332.

Upon recognizing a copy command of a specific area, the copy module 334 temporarily stores the data value of the text information extracted by the selection module 332.

Upon recognizing a paste command of the data value of the text information, the copy module 334 pastes the temporarily stored data value of the text information onto a predetermined area.

The search module 336 searches for specific text information in the e-book. Hereinafter, a method for the search module 336 to search for the specific text information in the e-book will be described.

Upon recognizing a search command of a specific text information, the search module 336 calculates a location coordinate value of specific text information corresponding to the search command based on the collected data. That is, upon recognizing the search command of the specific text information, the search module 336 identifies the specific text information to be searched using the attribute information (ex: data value) of the text information in the collected data, and extracts a location coordinate value of the specific text information using the layout information in collected data.

The search module 336 detects vector image information displayed at a location corresponding to the location coordinate value of the specific text information among vector image information output on the screen, and displays the detected vector image information in a form recognizable by the user. For example, the search module 336 displays the vector image information while highlighting the detected vector image information in a predetermined manner, thereby allowing the user to recognize the highlight effect as a search result for the specific text information. Further, the search module 336 may move a page of the e-book outputted on the screen to a page where the detected vector image information exists, and indicate pointing means such as a mouse cursor, and the like on the location of the corresponding vector image information in the page to display the detected vector image information. In the present embodiment, a method by which the search module 336 displays the detected vector image information corresponding to the search command of the specific text information to the user is not limited to a specific method.

Further, the operation of displaying the detected vector image information may be directly performed by the search module 336, but may also be performed by the controller 320 that controls the output of the e-book-related content.

Hereinafter, another method by which the search module 336 searches for the specific text information in the e-book will be described.

Upon recognizing the search command of the specific text information, the search module 336 extracts the data value and the location coordinate value of the specific text information corresponding to the search command based on the collected data. That is, upon recognizing the search command of the specific text information, the search module 336 identifies the specific text information to be searched using the attribute information of the text information in the collected data and extracts the location coordinate value of the specific text information using the layout information in the collected data.

The search module 336 extracts the data value of the specific text information by using the attribute information of the text information in the collected data and displays the extracted data value in a form recognizable by the user as the search result for the specific text information. For example, the search module 336 may detect the vector image information displayed at the corresponding location based on the location coordinate value of the previously extracted specific text information, and overlay and display the data value of the specific text information on the detected vector image information.

Further, upon displaying the data value of the text information, the search module 336 may further extract the font information, the size information, and the color information for the specific text information in the collected data, reflect the font information, the size information, and the color information into the data value of the text information, and display the data value of the text information.

The highlighting module 338 performs a function of providing the highlight effect for the specific text information in the e-book. Hereinafter, a method by which the highlighting module 338 provides the highlight effect for the specific text information in the e-book will be described.

Upon recognizing a highlighting command of the specific text information, the highlighting module 338 calculates a location coordinate value of the specific text information corresponding to the highlighting command based on the collected data.

Further, the highlighting module 338 calculates the location coordinate value of the specific text information corresponding to the highlighting command based on the collected data in the same manner as the manner in which the selection module 332 or the search module 336 calculates the location coordinate value of the text information in the method for recognizing the highlighting command. Therefore, a detailed description thereof will be omitted.

The highlighting module 338 detects vector image information displayed at a location corresponding to the location coordinate value of the specific text information among vector image information output on the screen, displays the vector image information while highlighting the detected vector image information in a predetermined manner. For example, the highlighting module 338 may generate an upper layer at the location of the detected vector image information and indicate the highlight effect on the upper layer to display the vector image with the highlight effect. In this connection, the highlighting module 338 may detect contour lines of an object corresponding to a character in the detected vector image information, highlight the detected contour lines of the object to display the highlighted contour lines of the object. In another embodiment, the highlighting module 338 may detect edge lines of the detected vector image information, highlight the detected edge lines and display the highlighted edge lines. The highlighting module 338 may display an area inside the outer contour with a specific color filled in order to maximize the highlight effect for the corresponding vector image information.

Likewise, the operation of indicating the highlight effect on the detected vector image information and displaying the vector image information with the highlight effect may be directly performed by the highlighting module 338, but may be performed by the controller 320 that controls the output of the e-book-related content.

Hereinafter, another method by which the highlighting module 338 provides the highlight effect for the specific text information in the e-book will be described.

Upon recognizing the highlighting command of the specific text information, the highlighting module 338 extracts the data value and the location coordinate value of the specific text information corresponding to the highlighting command based on the collected data. Further, the highlighting module 338 extracts the data value and the location coordinate value of the specific text information corresponding to the highlighting command based on the collected data in the same manner as the previous manner in which the search module 336 extracts the data value and the location coordinate value of the specific text information corresponding to the search command. Therefore, a detailed description thereof will be omitted.

The highlighting module 338 detects the vector image information displayed at the corresponding location based on the location coordinate value of the extracted specific text information, overlays the data value of the specific text information on the detected vector image information, and displays the vector image information overlaid with the data value of the specific text information. Further, the highlighting module 338 indicates the highlight effect on the displayed data value of the specific text information in a predetermined manner.

Further, upon displaying the data value of the specific text information, the highlighting module 338 may further extract the font information, the size information, and the color information for the specific text information in the collected data, reflect the font information, the size information, and the color information into the data value of the text information, and display the data value of the text information.

The display 340 performs a function of outputting results of the operations of the controller 320 and the function providing module 330 through display means.

Figure 4:
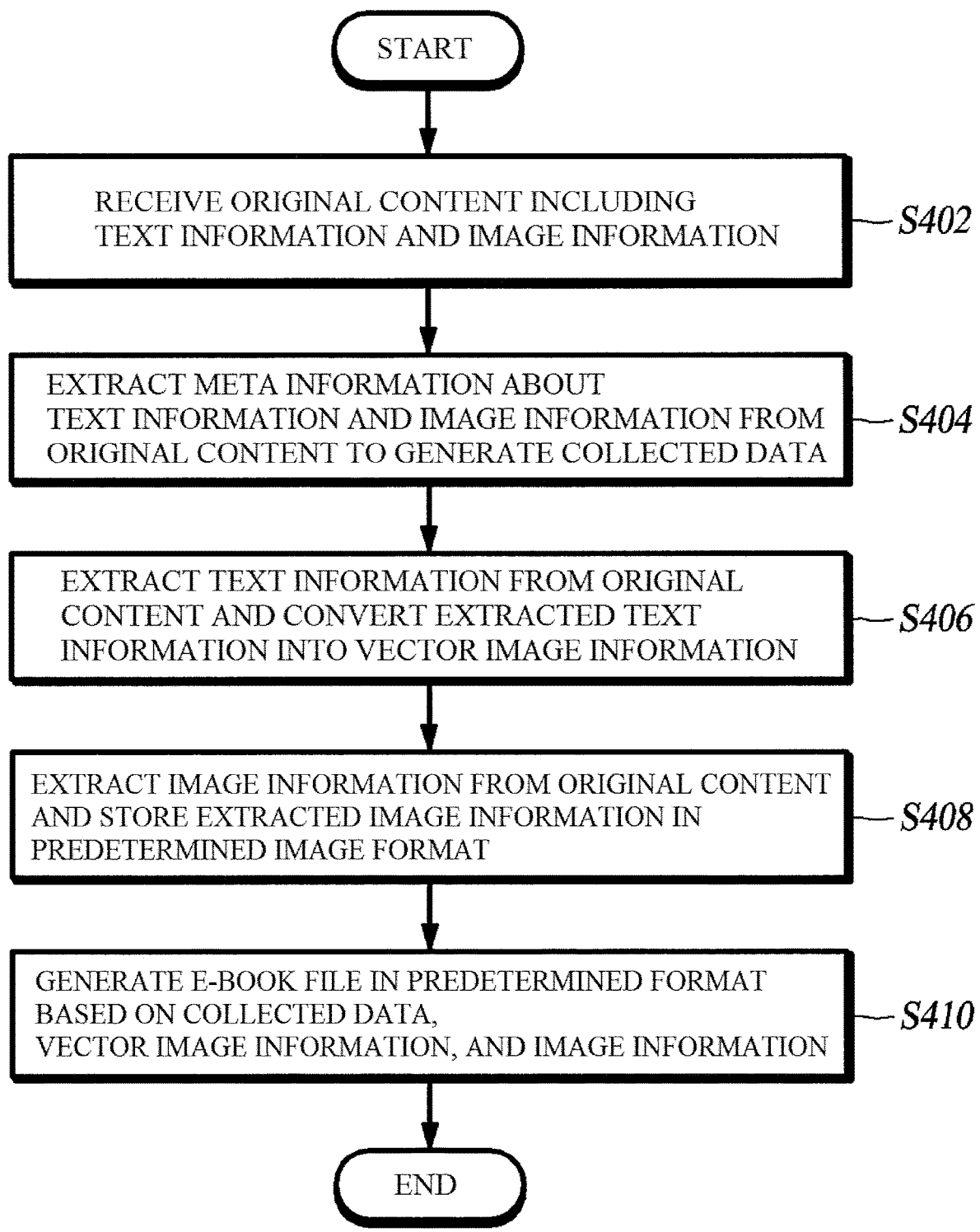
FIG. 4 is a flowchart for illustrating a method for producing an e-book according to the present embodiment.

FIG. 4 is a flowchart for illustrating a method for producing an e-book according to the present embodiment.

The e-book producing device 100 receives the original content including the text information and the image information (S402).

The e-book producing device 100 extracts the meta information about the text information and the image information from the original content received in S402 to generate the collected data (S404). The layout information including the location coordinate value for each of the text information and the image information, and the attribute information including the data value (text content) corresponding to the text information may be collected as the meta information. According to an embodiment, at least one of the font information, the size information, and the color information for the text information may be additionally collected as the attribute information for the text information.

The e-book producing device 100 extracts the text information from the original content received in step S402 and converts the extracted text information into the vector image information (S406). In S406, the e-book producing device 100 outlines the contour line of the character in the text information to calculate coordinates and numeral information about the plurality of lines constituting the text of the text information, then reconstructs the format of the text information into the image format based on the calculated coordinates and numeral information.

The e-book producing device 100 extracts the image information from the original content, and stores and provides the extracted image information in a predetermined image format (S408). In S408, the e-book producing device 100 stores the extracted image information in the bitmap image format or the vector image format.

The e-book producing device 100 generates the e-book file in the predetermined format based on the collected data in S404, the vector image information in S406, and the image information in S408 (S410). In S410, the e-book producing device 100 compresses the collected data, the vector image information, and the image information into the single file using the compression program, and changes the extension of the single file into the ePUB format to generate the ePUB file.

In this connection, the operations S402 to S410 correspond to the operations of the respective components of the e-book producing device 100 described above, and thus a detailed description will be omitted.

Figure 5:
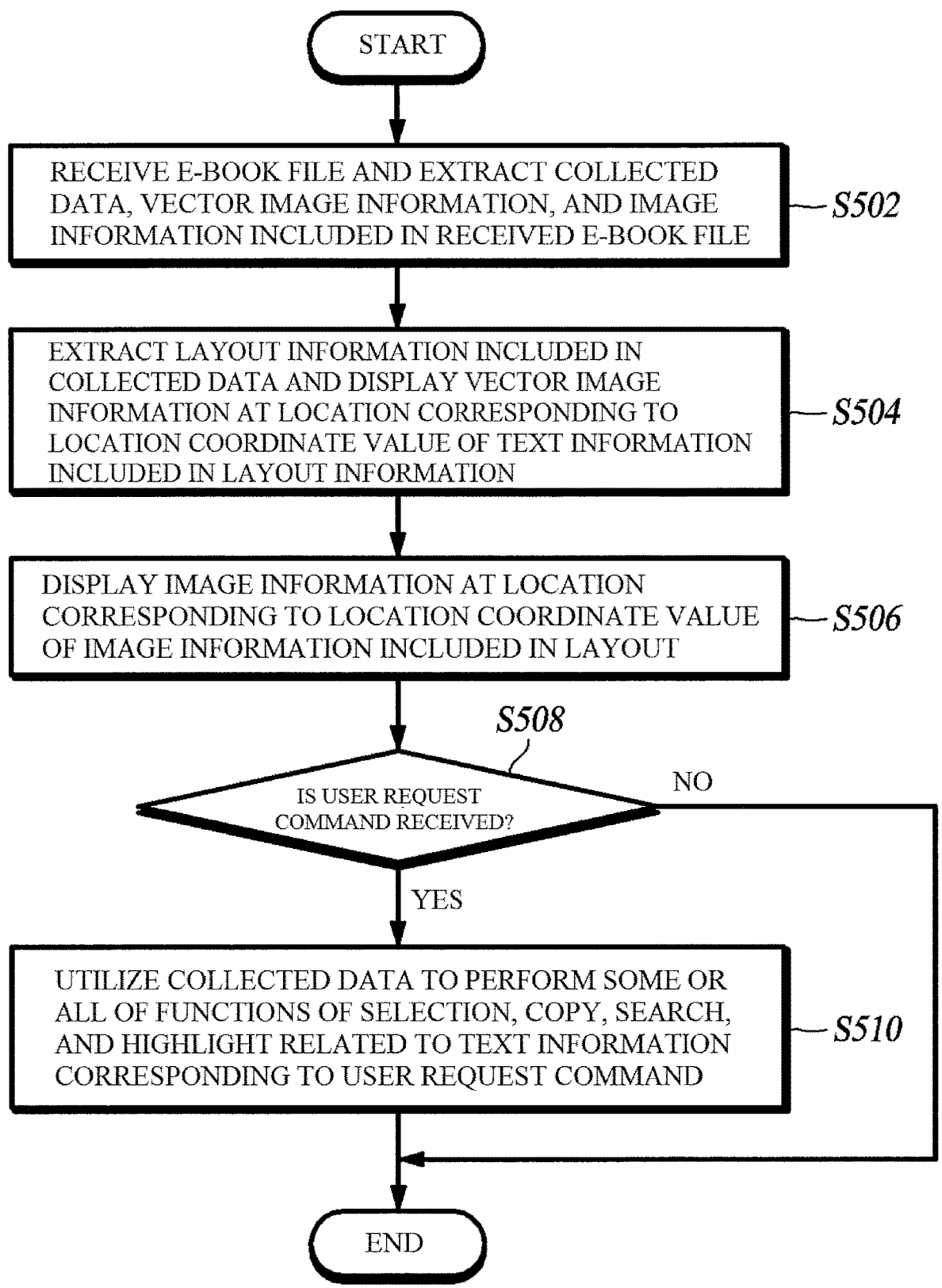
FIG. 5 is a flowchart for illustrating a method for outputting an e-book according to the present embodiment.

FIG. 5 is a flowchart for illustrating a method for outputting an e-book according to the present embodiment.

The e-book viewer device 120 receives the e-book file and extracts the collected data, the vector image information, and the image information included in the received e-book file (S502).

The e-book viewer device 120 extracts the layout information included in the collected data and displays the vector image information at the location corresponding to the location coordinate value of the text information included in the layout information (S504). That is, the e-book viewer device 120 displays and provides the vector image information corresponding to the text information on the location where the existing text information is displayed based on the layout information included in the collected data.

The e-book viewer device 120 displays the image information at the location corresponding to the location coordinate value of the image information included in the layout information (S506).

Upon receiving a user request command related to specific text information in the e-book (S508), the e-book viewer device 120 utilizes the collected data extracted in S502 to recognize the specific text information from the vector image information, and performs some or all of the additional functions of the selection, copy, search, and highlight related to the corresponding specific text information therethrough (S510).

In this connection, the operations S502 to S510 correspond to the operations of the respective components of the e-book viewer device 120 described above, and thus a detailed description will be omitted.

It is described that each process is executed sequentially in FIGS. 4 and 5, but is not limited thereto. The processes described in FIGS. 4 and 5 may be applied by changing an order of the processes or by executing the one or more processes in parallel. Therefore, FIGS. 4 and 5 are not limited to time-series order.

Further, the e-book production method described in FIG. 4 and the e-book output method described in FIG. 5 may be implemented in a program, and recorded in a recording medium (CD-ROM, RAM, ROM, memory card, Hard disk, magneto-optical disk, storage device, etc.).

Figure 6:
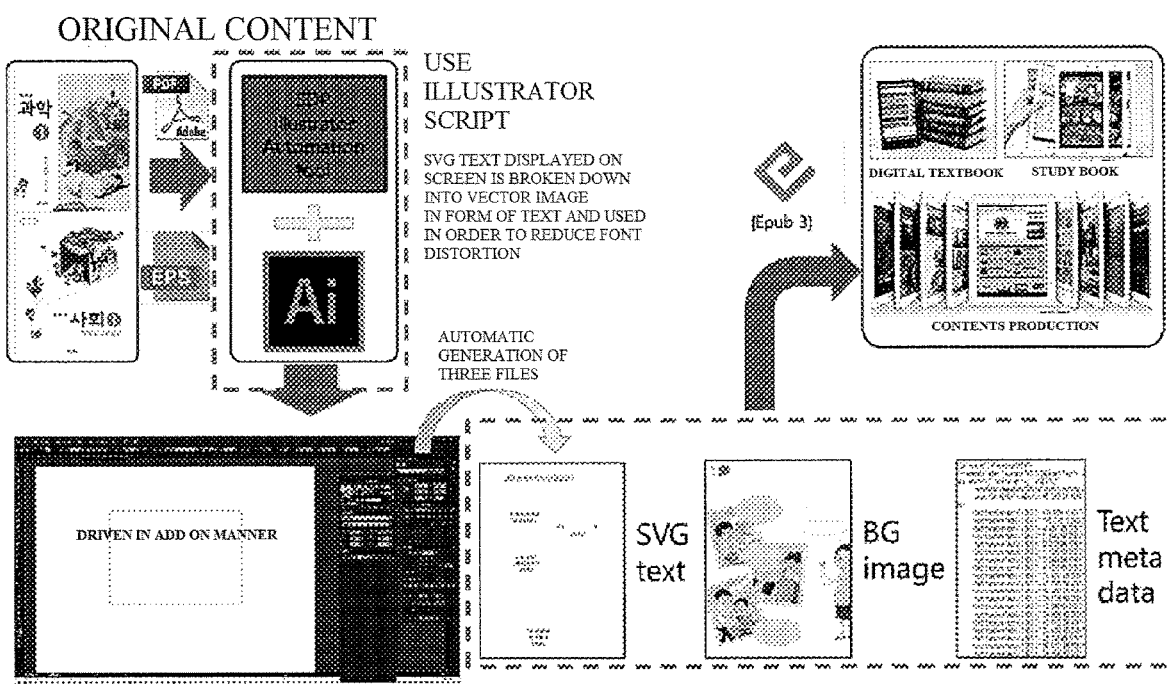
FIG. 6 is an exemplary diagram illustrating a method for producing an e-book according to the present embodiment.

FIG. 6 is an exemplary diagram illustrating a method for producing an e-book according to the present embodiment.

As shown in FIG. 6, when the original content is input, the e-book producing device 100 according to the present embodiment activates the authoring tool program in the hardware such that the predetermined script is executed and the general processes for the e-book production are automatically performed by the executed script. That is, the e-book producing device 100 may automatically extract the collected data, the vector image information, and the image information from the original content using the script function of the authoring tool program and generates the e-book file in the predetermined format based on the extracted three files.

The e-book producing device 100 according to the present embodiment has the effect in which the e-book-related content file is automatically generated utilizing the script function of the authoring tool program in the production of the e-book, thereby minimizing manufacturing cost and time required. Further, as the e-book production process is fully automated, the occurrence of the content distortion may be minimized, and the inspection expenses, and the like incurred in connection with the content distortion may be reduced.

Figure 7:
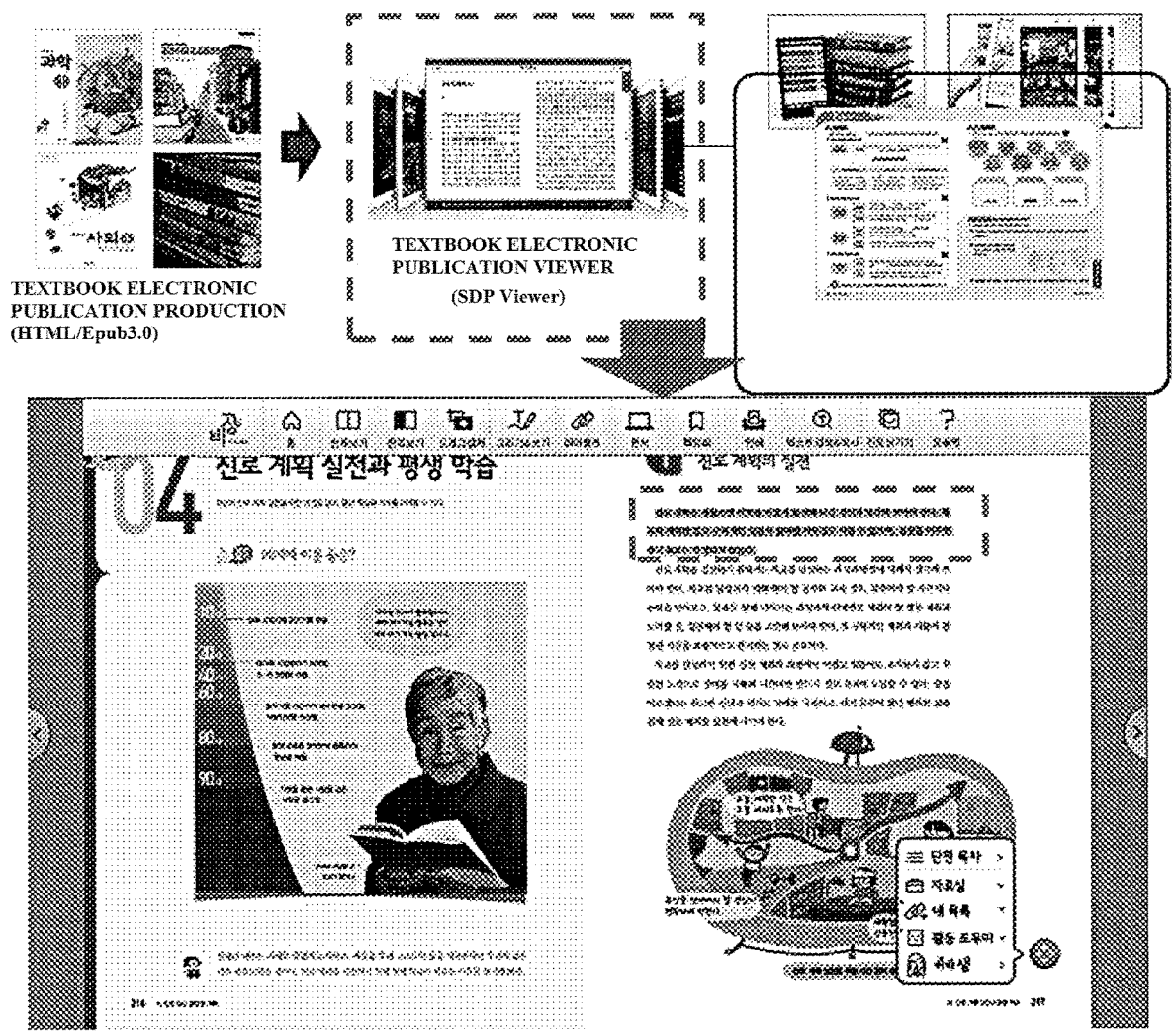
FIG. 7 is an exemplary diagram illustrating a method for outputting an e-book according to the present embodiment.

FIG. 7 is an exemplary diagram illustrating a method for outputting an e-book according to the present embodiment.

As shown in FIG. 7, the e-book viewer device 120 according to the present embodiment displays the text information for which the readability is important using the vector-based graphics such that the content having the high readability compared to the conventional one may be provided. Further, as the text information is displayed using the vector-based graphics, the occurrence of the error in the text information that may be caused by the attribute difference between the fonts that may be supported by each e-book viewer device may be prevented in advance.

The e-book viewer device 120 provides the bitmap image format for the image information corresponding to the background image in the content, thereby minimizing the total capacity of the e-book file. Further, in another embodiment, the e-book viewer device 120 provides the image information in the vector image format, thereby providing the clearer image for the corresponding image information.

Further, the e-book viewer device 120 operates to recognize the text information displayed using the vector-based graphics utilizing the collected data, thereby performing various additional functions such as the selection, copy, search, highlight, and the like related to the text information.

Figure 8:
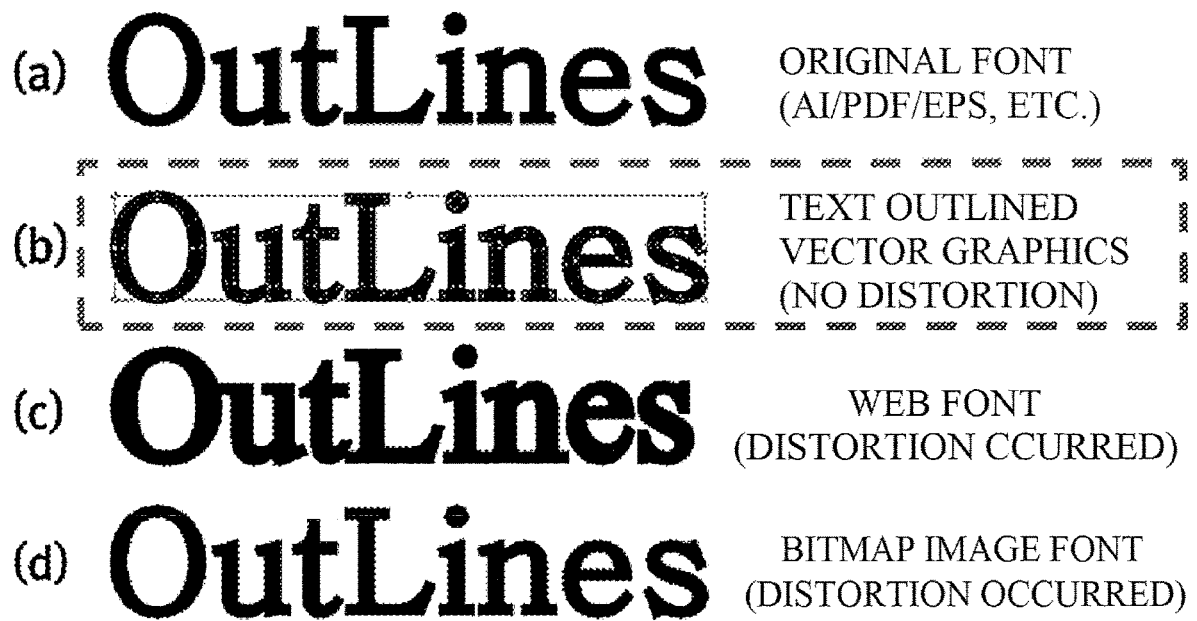
FIG. 8 is an exemplary diagram illustrating characteristics of text information produced using vector-based graphics according to the present embodiment.

FIG. 8 is an exemplary diagram illustrating characteristics of text information produced using vector-based graphics according to the present embodiment.

As shown in FIG. 8, when the text information is output from the e-book viewer device, the error may occur due to the attribute difference between the fonts that may be supported by the e-book viewer device. For example, when outputting text information shown in FIG. 8a on the web, it may be seen that a distortion occurs due to a difference in rendering between the fonts as shown in FIG. 8c. In addition, when outputting the text information shown in FIG. 8a as the bitmap image, as shown in FIG. 8d, a staircase phenomenon occurs in expansion and contraction such that it may be seen that a distortion occurs.

On the other hand, in a case of the e-book viewer device 120 according to the present embodiment, it may be seen that, as the text information is provided using the outlined vector graphics, the text information may be directly output on the screen without any distortion regardless of the attribute difference between the fonts that may be supported by the e-book viewer device.

Figure 9:
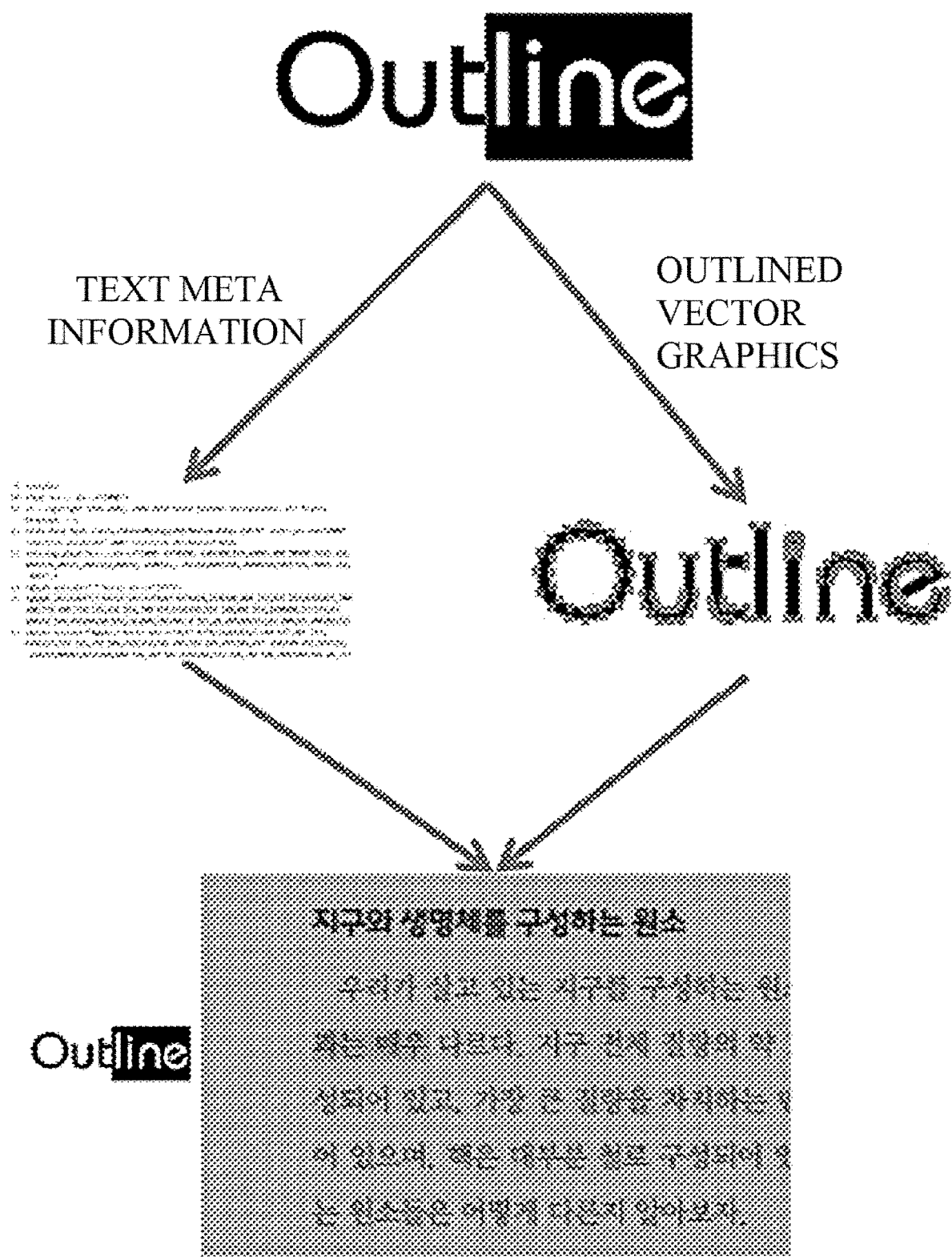
FIG. 9 is an exemplary diagram illustrating a method for utilizing text information produced using vector-based graphics according to the present embodiment.

FIG. 9 is an exemplary diagram illustrating a method for utilizing text information produced using vector-based graphics according to the present embodiment.

The e-book viewer device 120 according to the present embodiment provides the text information using the vector-based graphics. Further, when the text information is imaged, the text information loses its function as the text and becomes the figure itself. In this case, the conventional method for recognizing the text information has a problem that the text information may not be recognized from the vector image information. Taking this into account, the e-book viewer device 120 according to the present embodiment utilizes the layout information and the attribute information of the text information included in the collected data to recognize the text information corresponding to the vector image information. Therefore, the additional functions such as selecting, copying, searching, highlighting, and the like related to the text information may be performed therethrough.

With reference to FIG. 9, the e-book viewer device 120 according to the present embodiment provides the additional functions related to the text information utilizing the collected data.

Hereinabove, although the present disclosure has been described with reference to exemplary embodiments, the present disclosure is not limited thereto, but may be variously modified and altered by those skilled in the art to which the present disclosure pertains without departing from the spirit and scope of the present disclosure. Therefore, the present embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

Technical Effect

As described above, according to the present embodiment, the image information displayed on a screen in the production of the e-book is provided using a bitmap image format and the text information is provided using a vector-based graphic, thereby minimizing a total capacity of an e-book file and providing content having a high readability compared to a conventional one.

Further, according to the present embodiment, the text information is converted into the vector-based graphics, thereby preventing an occurrence of an error due to an attribute difference between fonts that may be supported by each e-book viewer device in advance.

Further, according to the present embodiment, an e-book-related content file is automatically generated utilizing a script function of an authoring tool program in the production of the e-book, thereby minimizing manufacturing cost and time required.

Further, according to the present embodiment, the meta information about the text information is extracted from the original content and is provided with the text information in the production of the e-book, thereby allowing the e-book viewer device to recognize the text information produced using the vector-based graphics and providing various additional functions based thereon.

What is claimed is:

1. An e-book producing program stored in a recording medium, wherein the e-book producing program is configured to be in combination with hardware to perform an e-book producing method, wherein said e-book producing program comprising:
   receiving original content including text information and image information;
   extracting meta information about the text information and the image information from the original content to generate collected data which is a substitute data for replacing a data related to the text information lost in the process of imaging of the text information;
   extracting the text information from the original content and converting the text information into vector image information by outlining a contour line of a character in the text information to calculate coordinates and numerical information about a plurality of lines constituting a text of the text information, and reconstructing a format of the text information into an image format based on the calculated coordinates and numeral information;
   extracting the image information from the original content and storing the image information in a predetermined image format; and
   generating an e-book file in a predetermined format based on the collected data, the vector image information, and the image information.

2. The e-book producing program of claim 1, wherein the generating of the collected data includes:
   collecting, as the meta information, layout information including a location coordinate value for each of the text information and the image information; and
   collecting attribute information including a data value corresponding to the text information.

3. The e-book producing program of claim 1, wherein the storing of the image information in the predetermined image format includes:
   storing the image information in a bitmap image format or in a vector image format.

4. The e-book producing program of claim 1, wherein the generating of the e-book file includes:
   compressing the collected data, the vector image information, and the image information into a single file while converting an extension of the single file into an ePUB format, thereby to generate an ePUB file.

5. The e-book producing program of claim 1, further comprising, when the original content is input thereto, activating an authoring tool program in the hardware to execute a predetermined script.

6. An e-book viewer program stored in a recording medium, wherein the e-book viewer program is configured to be in combination with hardware to perform an e-book viewing method, wherein the method includes:
- extracting, vector image information reconstructed a format of the text information into an image format based on the text information, collected data, which is a substitute data for replacing a data related to the text information lost in the process of reconstruction of the text information, and image information included in a received e-book file;
- extracting layout information included in the collected data and displaying the vector image information at a location corresponding to a location coordinate value of text information included in the layout information; and
- displaying the image information at a location corresponding to a location coordinate value of image information included in the layout information; and
- utilizing the layout information and the attribute information of the text information included in the collected data to recognize the text information corresponding to the vector image information and performing selecting, copying, searching, and highlighting related to recognized text information.

7. The e-book viewer program of claim 6, wherein the method further comprises:
- recognizing a user selection of a specific area of the vector image information;
- determining a location coordinate value of text information corresponding to the specific area;
- extracting a data value of text information corresponding to the location coordinate value of the text information based on the collected data; and
- providing the extracted data value of the text information as a response to the user selection.

8. The e-book viewer program of claim 7, wherein the method further comprises:
- recognizing a copy command of the specific area;
- temporarily storing the data value of the text information;
- recognizing a paste command of the data value of the text information; and
- pasting the temporarily stored data value of the text information onto a predetermined area.

9. The e-book viewer program of claim 6, wherein the method further comprises:
- recognizing a search command of specific text information;
- calculating a location coordinate value of the specific text information corresponding to the search command based on the collected data; and
- detecting vector image information displayed at a location corresponding to a location coordinate value of the specific text information and displaying the detected vector image information in a form recognizable by a user.

10. The e-book viewer program of claim 7, wherein the method further comprises:
- recognizing a highlighting command of specific text information;
- calculating a location coordinate value of the specific text information corresponding to the highlighting command based on the collected data; and
- detecting vector image information displayed at a location corresponding to a location coordinate value of the specific text information, and displaying the vector image information while highlighting the detected vector image information in a predetermined manner.

* * * * *